United States Patent [19]

Ogasawara et al.

[11] Patent Number: 5,537,552
[45] Date of Patent: Jul. 16, 1996

[54] APPARATUS FOR SELECTIVELY COMPARING POINTERS TO DETECT FULL OR EMPTY STATUS OF A CIRCULAR BUFFER AREA IN AN INPUT/OUTPUT (I/O) BUFFER

[75] Inventors: Yutaka Ogasawara, Yokohama; Yoshitaka Ogino, Kawasaki; Masami Shimakura, Tokyo, all of Japan

[73] Assignee: Canon Kabushiki Kaisha, Tokyo, Japan

[21] Appl. No.: 93,039

[22] Filed: Aug. 17, 1993

Related U.S. Application Data

[63] Continuation of Ser. No. 798,545, Nov. 26, 1991, abandoned.

[30] Foreign Application Priority Data

Nov. 27, 1990 [JP] Japan .................................. 2-326227
Nov. 27, 1990 [JP] Japan .................................. 2-326228

[51] Int. Cl.⁶ .................................................. G06F 12/06
[52] U.S. Cl. ...................... 395/250; 365/73; 365/189.05; 395/464; 395/877; 364/DIG. 1; 364/238.8; 364/238.9; 364/239.51; 364/239.6; 364/249.4; 364/263
[58] Field of Search ......................... 360/27; 364/DIG. 1, 364/DIG. 2; 365/73, 189.04, 189.05, 74; 395/250, 275, 425, 800, 200.08, 872, 876, 877, 405, 457, 464, 419, 421.03, 375

[56] References Cited

U.S. PATENT DOCUMENTS

| | | | |
|---|---|---|---|
| 3,643,221 | 2/1972 | Chambers | 395/250 |
| 4,195,340 | 3/1980 | Joyce | 395/460 |
| 4,210,960 | 7/1980 | Borgerson et al. | 393/375 |
| 4,245,303 | 1/1981 | Durvasula et al. | 395/250 |
| 4,280,193 | 7/1981 | Baun et al. | 395/884 |
| 4,298,927 | 11/1981 | Berglund et al. | 395/375 |
| 4,371,927 | 2/1983 | Wilhite et al. | 395/250 |
| 4,439,828 | 3/1984 | Martin | 395/375 |
| 4,467,411 | 8/1984 | Fry et al. | 395/250 |
| 4,792,898 | 12/1988 | McCarthy et al. | 395/445 |
| 4,800,483 | 1/1989 | Yamamoto et al. | 395/306 |
| 4,849,956 | 7/1989 | Aizawa | 369/58 |
| 4,866,609 | 9/1989 | Calta et al. | 395/250 |
| 4,910,724 | 3/1990 | Sakagami et al. | 369/100 |
| 4,991,169 | 2/1991 | Davis et al. | 370/77 |
| 5,053,945 | 10/1991 | Whisler | 395/600 |
| 5,157,784 | 10/1992 | Nishiyama | 395/600 |
| 5,265,228 | 11/1993 | Beaudoin et al. | 395/306 |
| 5,321,558 | 6/1994 | Tackett | 360/39 |
| 5,363,485 | 11/1994 | Nguyen et al. | 395/250 |

Primary Examiner—Thomas C. Lee
Assistant Examiner—Lance L. Barry
Attorney, Agent, or Firm—Fitzpatrick, Cella, Harper & Scinto

[57] ABSTRACT

An information reproducing apparatus for reproducing recorded data includes a buffer, a control device and a determining device. The buffer stores data blocks read out from a recording medium and includes first and second storage areas having respectively discontinuous storing and read addresses. The apparatus is controlled to execute in parallel a first process for storing the data blocks into the buffer and a second process for reading out the data blocks stored in the buffer to transfer the data blocks to a host apparatus. The determining device determines whether there are data in the first storage area to be transferred to the host apparatus by comparing a storing address in the buffer of the data which are being stored into the first storage area with a read address in the buffer of the data which are being read out from the first storage area. The first process is controlled so that a predetermined data block which has been read out from the recording medium is stored into the second storage area. When the predetermined data block is stored into the second storage area, the determining device does not compare the storing address in the buffer of the data which are being stored into the second storage area with the read address in the buffer of the data which are being read out from the buffer.

13 Claims, 10 Drawing Sheets

READ CHECK FLAG=1

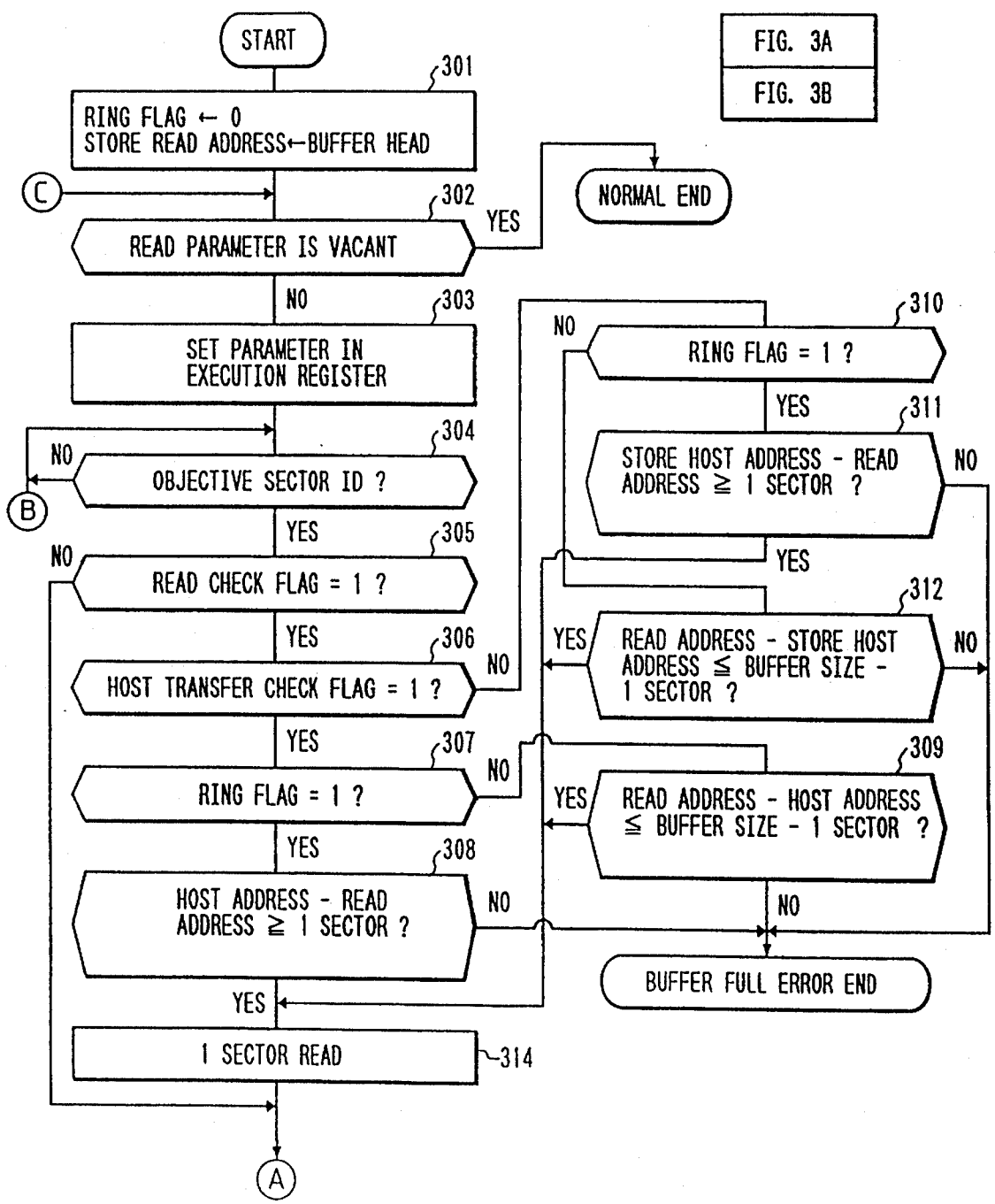

HOST TRANSFER FLAG=1

HOST TRANSFER CHECK FLAG=0

HOST TRANSFER CHECK FLAG=1

| ITEM \ PARAMETER | 1 | 2 |
|---|---|---|
| SECTOR ID | S1 | S4 |
| NUMBER OF SECTOR | 2 | 2 |
| BUFFER ADDRESS | 0 | 1024 |
| CHECK FLAG | 1 | 1 |

| ITEM \ PARAMETER | 1 | 2 | 3 |
|---|---|---|---|
| BUFFER ADDRESS | 0 | 10000H | 1024 |
| NUMBER OF TRANSFER BYTE | 1024 | 512 | 1024 |
| BUFFER FLAG | 1 | 0 | 1 |

READ DATA BLOCK — HOST DESIGNATION DATA BLOCK $d_1$ — PREREAD DATA BLOCK $d_2$

APPARATUS FOR SELECTIVELY COMPARING POINTERS TO DETECT FULL OR EMPTY STATUS OF A CIRCULAR BUFFER AREA IN AN INPUT/OUTPUT (I/O) BUFFER

This application is a continuation of prior application Ser. No. 07/798,545 filed Nov. 26, 1991, now abandoned.

BACKGROUND OF THE INVENTION

1. Field of the Invention

The invention relates to an information reproducing apparatus for reading information from a recording medium such as an optical disc, a magnetooptic disc, or like recording media.

2. Related Background Art

Hitherto, magnetic discs, optical discs, and like recording media have been known as information recording media of the disc type. In such a disc-shaped recording medium, for instance, a spiral track is divided into a plurality of sectors and information is recorded on a sector unit basis.

It is known that an error rate of information recording on an optical disc is high. Therefore, a process to raise the reliability of data is executed by adding an error correction code (ECC) to the data. Just after recording data into the sector, processes to reproduce the data recorded in the sector and to verify whether the data could be correctly recorded or not are executed. When an error occurs, the data are again recorded to the same sector or the data are recorded to another alternate sector, thereby enabling the defective sector to be relieved. Such an adding process of the correction code, a deleting process, or a verifying process is executed by an ECC circuit, which will be explained hereinafter.

Such an information reproducing apparatus using the optical disc records or reproduces information in accordance with an instruction of a host apparatus as an upper control apparatus. Generally, in many cases, the speed when data are transferred from the host apparatus to the information recording and reproducing apparatus differs from the actual recording speed of the data to the optical disc. The information recording and reproducing apparatus, therefore, has a buffer memory and the buffer memory is used to temporarily store the data from the host apparatus or to temporarily store the reproduction data from the optical disc. In the case of performing the verifying process as mentioned above, the buffer memory is also used to preserve the data until the verifying process is finished in order to again record the data of the sector having an error when an error occurs.

In order to raise the speed of the reproducing process from the disc, there is generally used a method whereby the data of each sector which has been read into the buffer from the disc are transferred to the host apparatus instead of using a method whereby all of the data designated from the host apparatus are read into the buffer from the disc and, after that, the data are transferred to the host. That is, the data transfer from the disc to the buffer and the data transfer from the buffer to the host apparatus are executed in parallel and all of the data are transferred to the host apparatus, thereby reducing the reading time and transfer time.

The above conventional method will now be described with reference to FIGS. 11A and 11B. FIGS. 11A and 11B show states of the reproduction data stored into the buffer. A hatched portion indicates the data which have been read out of the disc and are not transferred yet to the host. A host transfer pointer indicates a position of the data in the buffer which are transferred to the host. The value of the pointer are updated when the data are transferred. A read pointer indicates a position to store the reproduction data from the disc. The value of the read pointer are updated when the data are stored. As shown in FIG. 11B, the buffer is a ring buffer. The host transfer pointer or read pointer is moved to the head of the buffer when it reaches the end of the buffer.

The reproducing process from the disc and the data transferring process to the host are performed in parallel while checking whether the buffer is full or empty by comparing the values of those two pointers. That is, when the read pointer circulates one loop and catches up the host transfer pointer, it is determined that the buffer is full, so that the reproducing process from the disc is interrupted. When the host transfer pointer catches up to the read pointer, it is decided that the buffer is empty, so that the data transfer to the host is interrupted.

A prereading process of the data is generally executed to raise the speed of the reading process. The data prereading process denotes a process in which the data block next to the read data block designated from the host apparatus is stored into the buffer subsequent to the reading process of the designated data block and, when a read command of the next data block is sent from the host, the reproduction from the disc is not performed and the data stored in the buffer is transferred to the host. When the number of sequential accesses to the disc is large, the prereading process improves the throughput. A practical example of the prereading process will now be described with reference to FIGS. 9 and 10. FIG. 9 shows a read data block of the disc which is stored into the buffer. There is a data block $d_2$ which is preread subsequent to a data block $d_1$ designated from the host. FIG. 10 shows a storing state of the data in the buffer. The area in the buffer is divided into an area $B_1$ which is used in the ordinary reading process and an area $B_2$ to store the preread data. The reason why the buffer is divided into two areas is to make the data handling easy. The host designation data block $d_1$ in FIG. 9 is stored into the ordinary data storing area $B_1$. The preread data block $d_2$ is stored into the preread data storing area $B_2$.

The method of discriminating whether the buffer is full or empty by comparing the host transfer pointer and the read pointer as described in FIGS. 11A and 11B, however, cannot be performed so long as the prereading process is executed. This is because when the read pointer indicative of the storing position of the reproduction data continuously changes as shown in FIG. 11A, it can be compared with the host transfer pointer, but when the preread data is stored into the buffer, the read pointer does not continuously change as shown at $d_2$ in FIG. 10, so that it cannot be compared with the host transfer pointer. In other words, when the operator tries to execute the preread data process, the reproducing process from the disc and the data transfer process to the host cannot be executed in parallel, so that the processing speed becomes slow.

The memory area of the optical disc is divided into a data area to record data and an alternate area which is alternated when a defect exists in the data area. FIG. 12 is a diagram of a format of the optical disc. It is now assumed that a read request of the read block 1 (comprising a plurality of sectors) in the data area is sent from the host apparatus. The information reproducing apparatus moves the reading head to the head sector of the read block 1 and sequentially reads out the data from the head sector and stores the data into the buffer.

At the same time, the data is sequentially transferred to the host apparatus from the data which has already been stored in the buffer and has been error corrected. FIG. 13A shows a state of the buffer at that time.

A hatched portion in the buffer indicates a portion in which the data reading process from the disc and the error correction were finished. On the other hand, the read pointer indicates an address to subsequently store the data from the disc. The host transfer pointer indicates an address to subsequently transfer the data to the host apparatus.

In the conventional information reproducing apparatus, a check is made to see if the buffer is full or empty by comparing the host transfer pointer and the read pointer as mentioned above. That is, when the host transfer pointer catches up to the read pointer, the buffer is determined to be empty and the data transfer to the host apparatus is interrupted. On the contrary, when the read pointer circulates one loop and catches up to the host transfer pointer, the buffer is decided to be full and the reading process from the disc is interrupted.

In the above conventional example, however, there are drawbacks such that the full/empty states of the buffer cannot be managed in the following cases and the reading process from the disc to the buffer and the data transfer from the buffer to the host cannot be executed in parallel and the processing speed becomes slow.

Such an example will be explained with reference to FIGS. 12 and 13B. A defective sector 1 is included in a read block 2 in FIG. 12. An alternate sector for the defective sector 1 is the alternate sector 1 in the alternate area. It is now assumed that a read request of the read block 2 is sent from the host apparatus. Since the moving time of a reading head of the information reproducing apparatus is generally slow, there is known a method whereby in order to raise the speed of the reading process including the defective sector, the alternate sector of the disc is preread into the buffer and the number of moving times of the reading head is reduced (for example, U.S. Pat No. 4,849,956). FIG. 13B shows a state in the buffer in the case when the read block 2 in FIG. 12 has been read by the above method.

In FIG. 13B, a hatched portion indicates data which have been read out of the disc. The alternate sector 1 for the defective sector 1 is previously stored into the area of the preread data 1 in the buffer. The normal sector of the read block 2 is stored into another area different from the area of the preread data 1. In such a case, the host transfer pointer indicative of the address to which the data is transferred to the host apparatus does not indicate the continuous area. It is, accordingly, impossible to check whether the buffer is full or empty by comparing the host transfer pointer and the read pointer.

SUMMARY OF THE INVENTION

It is an object of the invention to provide an information reproducing apparatus which can eliminate the foregoing drawbacks.

Another object of the invention is to provide an information reproducing apparatus which can check whether a buffer is full or empty while executing the data storage into the buffer and the data transfer from the buffer to a host apparatus in parallel.

Another object of the invention is to provide an information reproducing apparatus which can check whether a buffer is empty or full while executing the data storage into the buffer and the data transfer from the buffer to a host apparatus in parallel.

The above and other objects and features of the present invention will become apparent from the following detailed description and the appended claims with reference to the accompanying drawings.

BRIEF DESCRIPTION OF THE DRAWINGS

FIG. 3, comprising FIG. 3A and FIG. 3B, is a flowchart showing the operation of a read control unit of the ODC;

DETAILED DESCRIPTION OF THE PREFERRED EMBODIMENTS

Figure 1:
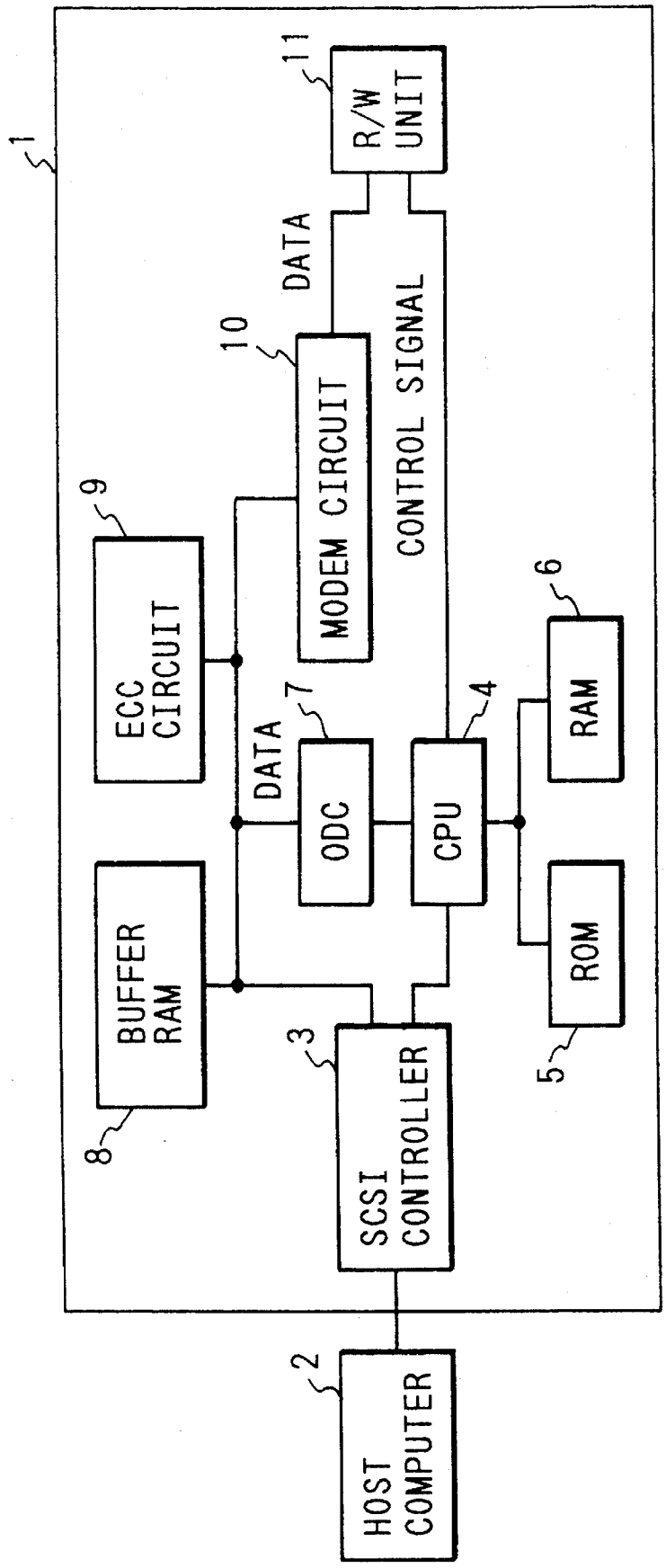
FIG. 1 is a block diagram showing an embodiment of an information reproducing apparatus to which the invention can be applied.

An embodiment of the present invention will be described in detail hereinbelow with reference to the drawings. FIG. 1 is a block diagram showing an embodiment of an information reproducing apparatus of the invention.

In FIG. 1, an optical disc driving apparatus 1 is connected to a host computer 2 and executes the recording of data to an optical disc (not shown) or the reproduction of the data from the optical disc in accordance with an instruction from the host computer 2. An SCSI (Small Computer System Interface) is used as an interface between the optical disc driving apparatus 1 and the host computer 2 and executes the hand shaking of commands, data, etc. under the control of an SCSI controller 3.

A CPU 4 receives the command sent from the host computer 2 through the SCSI controller 3 and controls a reading/writing process of data, which will be explained hereinafter.

A ROM 5 is a memory in which a control program of the CPU 4 is stored and a RAM 6 is a work memory of the CPU 4.

An ODC (Optical Disc Controller) 7 controls the read/write data. The operation of the ODC 7 is controlled by the CPU 4. A practical construction of the ODC 7 will be explained in detail hereinafter.

A buffer RAM 8 is a buffer memory for the read/write data. An ECC circuit 9 is a circuit to execute a modulating process for adding an ECC (Error Correction Code) to data of a user or a demodulating process for performing the error correction using the ECC. The ECC circuit 9 also has a verifying function to discriminate whether a defect of a predetermined amount or more exists in the reproduction data or not by the ECC. A modem circuit 10 is a circuit to modulate a recording signal to the optical disc or to demodulate the reproduction signal from the optical disc. An R/W unit 11 is an apparatus for recording data onto the optical disc or for reading out the data from the optical disc.

Figure 2:
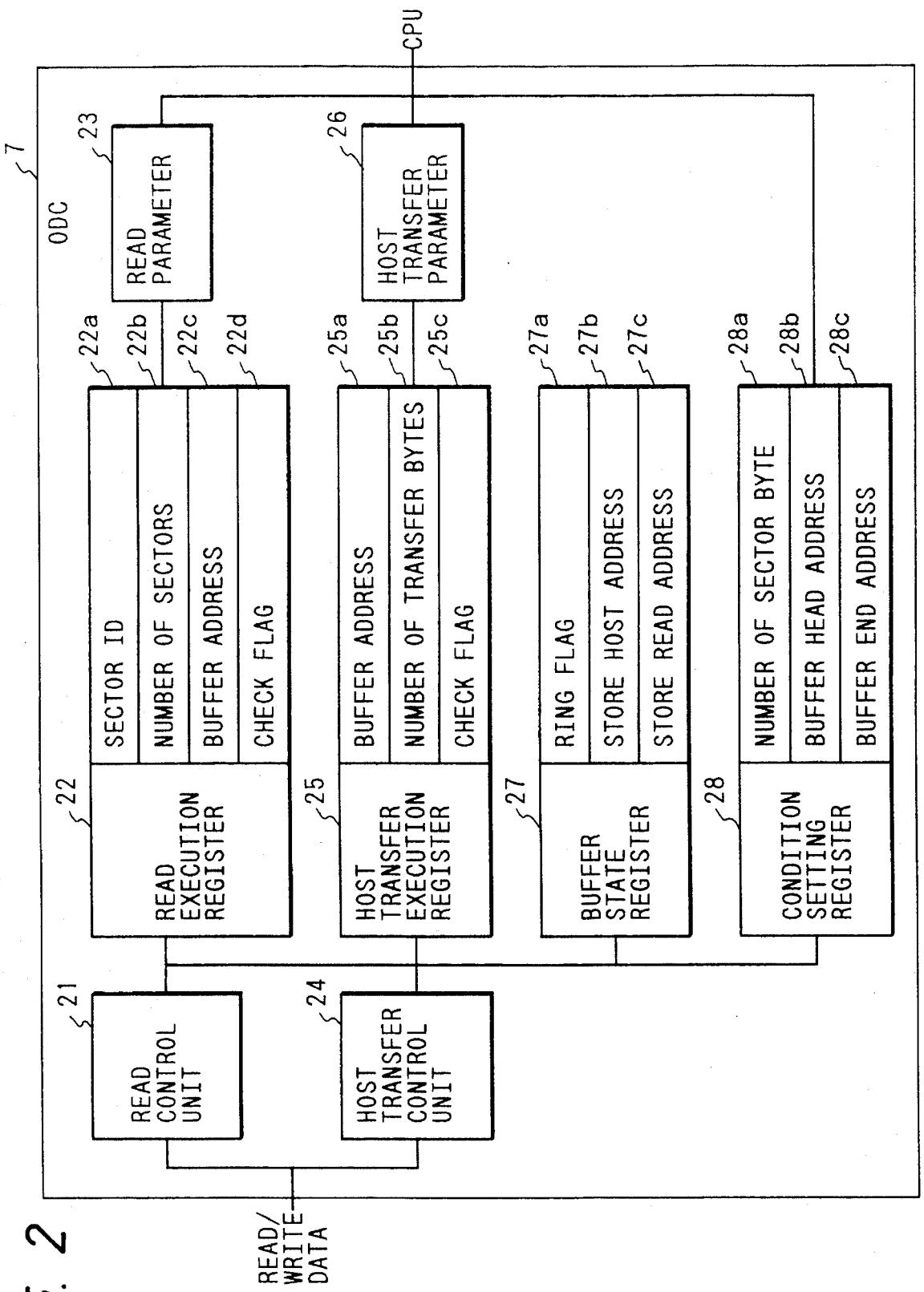
FIG. 2 is a block diagram of an Optical Disk Controller (ODC) showing the embodiment.

FIG. 2 is a block diagram showing a practical construction of the ODC 7. A read control unit 21 detects an ID (address) of the sector of the disc which is being processed by the R/W unit 11 from the reproduction data sent from the modem unit 10 and accessess the read data which have been error corrected from the ECC circuit 9 and stores the data into the buffer RAM 8. The operation of the read control unit 21 will be explained in detail hereinafter. Information to execute the reading process by the read control unit 21 is set in a read execution register 22. The read execution register 22 comprises: a sector ID 22a indicative of the head sector to be read; the number of sectors 22b indicative of the number of sectors to be read; a buffer address 22c indicative of a buffer address in which the read data are stored; and a check flag 22d to designate whether a process to check the full/empty state of the buffer is executed or not. The check flag 22d is set to "1" when such a checking process is performed and to "0" when the check is not performed. A read parameter 23 is used to designate the block to execute the reading process and is set by the CPU 4. The content of the read parameter 23 is the same as that of the read execution register and, although not shown, it comprises: a head sector ID to be read; the number of sectors; a head buffer address in which the read data is stored; and a check flag indicating whether the empty/full state of the buffer is checked or not. The read parameter 23 is constructed as a memory having a structure of FIFO (First In First Out) and a plurality of parameters can be set into the read parameter 23 by the CPU 4.

A host transfer control unit 24 controls the transfer of the read data stored in the buffer RAM 8 to the host computer 2 through the SCSI controller 3. The operation of the host transfer control unit 24 will be described in detail hereinafter. Information to execute a data transferring process by the host transfer control unit 24 is set into a host transfer execution register 25. The host transfer execution register 25 comprises: a buffer address 25a indicative of a buffer address of the data to be transferred; the number of transfer bytes 25b indicative of the number of bytes of the data to be transferred; and a check flag 25c to designate whether a check (empty check) regarding whether data which can be transferred exist in the buffer or not is executed or not.

The host check flag 25c is set to "1" when the check is performed and to "0" when the check is not executed. A host transfer parameter 26 is used to designate a data block to be transferred and is set by the CPU 4. The content of the host transfer parameter 26 is the same as that of the host transfer execution register and, although not shown, it comprises: a buffer address; the number of transfer bytes; and an empty check flag. The host transfer parameter 26 is constructed as a memory having an FIFO structure and a plurality of parameters can be set into the host transfer parameter 26 by the CPU 4.

A buffer state register 27 indicates a storing state of the buffer RAM 8 and comprises: a ring flag 27a to use the buffer RAM 8 as a ring buffer; a store host address 27b to temporarily store a buffer address of data which are transferred to the host; and a stored read address 27c to temporarily store the buffer address in which the read data from the disc is stored. The ring flag 27a are set to "1" when the read buffer address 22c circulates the buffer and to "0" when the host transfer buffer address 25a circulates the buffer.

A condition setting register 28 indicates a physical state of the optical disc driving apparatus 1 and comprises: the number of sector bytes 28a which indicates the number of bytes per sector of the disc and whose value is set by the CPU 4; a buffer head address 28b indicative of the head address to realize the ring buffer; and a buffer end address 28c indicative of the end address.

Figure 3B:
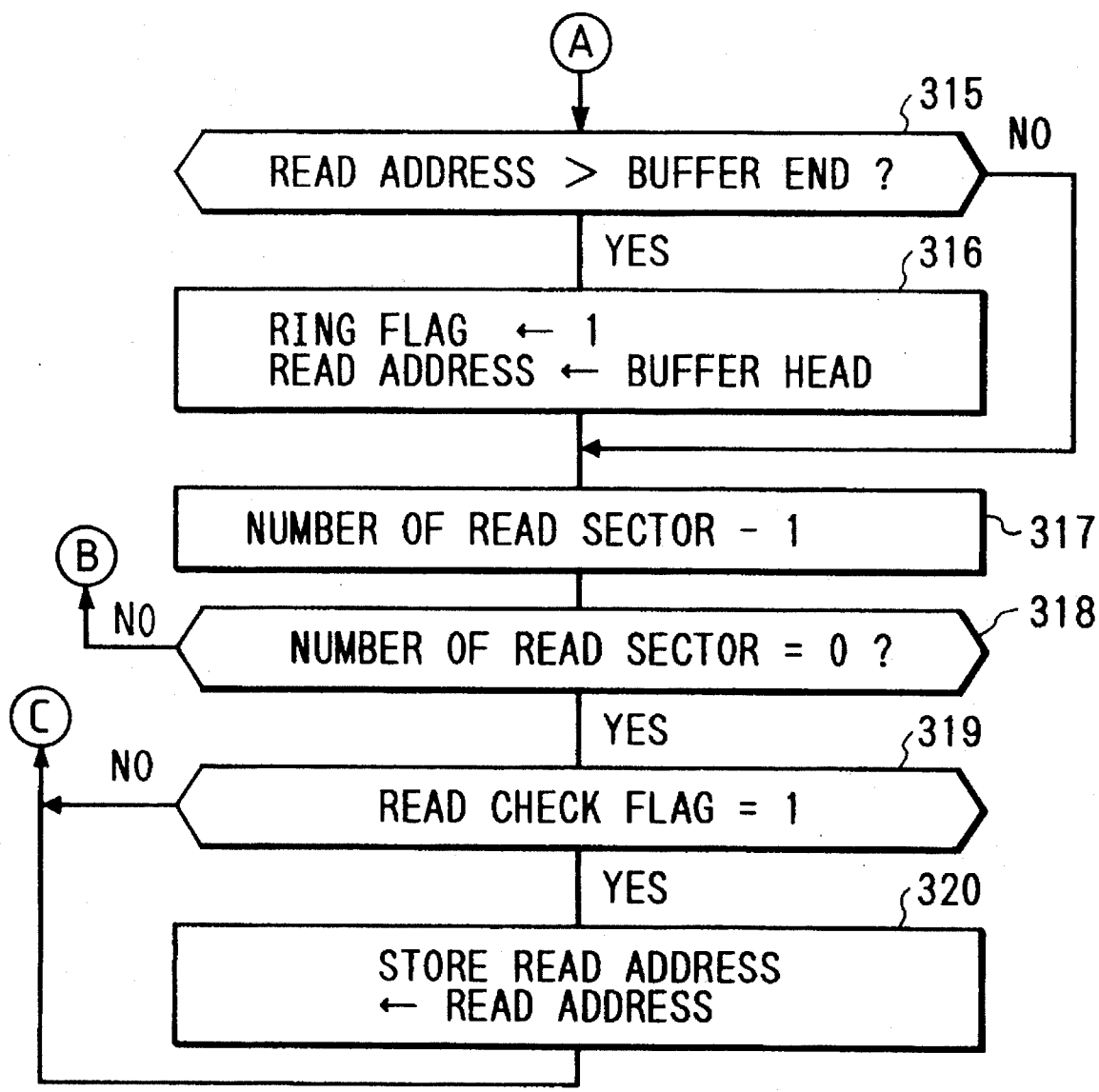

The operation of the read control unit 21 in the reading process will now be described with reference to FIG. 3. When the CPU 4 sets each parameter into the read parameter 23 of the ODC 7 and instructs the execution of the reading process to the read control unit 21, the read control unit 21 operates in accordance with the following sequence. At this time, each value in the condition setting register 28 is set by the CPU 4. First, the ring flag 27a is cleared to 0 in step 301 and the value of the buffer head address 28b is set into the store read address 27c. A check is made in step 302 to see if the parameters have been set in the read parameter 23 or not. When the read parameter 23 is empty, the processing routine is finished. When there are parameters in the read parameter 23, a set of parameters are read out from the head of the read parameter 23 in step 303 and are set into the read execution register 22. The sector ID on which the reading head is passing at present is detected by the data from the modem circuit 10 in step 304 and the value of the sector ID is compared with the sector ID 22a. When they differ, the above processes are repeated until they coincide. When they coincide, the read check flag 25c is checked in step 305. When the flag 25c is equal to 1, step 306 follows and the buffer full check is executed. When the flag 25c is equal to 0, step 315 follows and the buffer full check is not performed. When the host transfer check flag 25c is equal to 1 in step 306, a check is made in step 307 to see if the read buffer address 22c has exceeded the end address in the buffer and has been returned to the head address in the buffer and has circulated or not. When the read buffer address 22c has circulated (ring flag 27a=1), step 308 follows. If NO, step 309 follows and a buffer full check is executed to see if a space area of one sector exists in each buffer or not. That is, in step 308, the buffer full check is performed by discriminating whether a difference between the host buffer address 25a and the read buffer address 22c is equal to or larger than the value corresponding to one sector or not. In step 309, the buffer full check is performed by discriminating whether a difference between the read buffer address 22c and the host buffer address 25a is equal to or less than the value corresponding to the buffer size (the buffer end address 28c–the buffer head address 28b+1)–1 sector (the number of sector bytes 28a) or not. When it is determined that the buffer is full, step 313 follows and the read processing operation is finished. If NO, the processing routine advances to step 314 and subsequent steps.

When the host transfer check flag 25c is equal to 0 in step 306, step 310 follows and the state of the ring flag 27a is checked. The buffer full check is executed in steps 311 and 312. That is, when the ring flag 27a is equal to 1, a check is made in step 311 to see if a difference between the store host address 27b and the read buffer address 22c is equal to or larger than the value corresponding to one sector or not. When the ring flag 27a is equal to 0, a check is made in step 312 to see if a difference between the read buffer address 22c and the store host address 27b is equal to or less than the value of (the buffer size–1 sector) or not. When the buffer is determined to be full, step 313 follows and the read processing operation is finished. When the buffer is not full, the processing routine advances to step 314 and subsequent steps.

In step 314, the data which have been read out of the disc and error corrected are stored into the buffer RAM 8 from the position of the read buffer address 22c by the amount corresponding to the number of sector bytes 28a. At this time, the read buffer address 22c is updated by the value corresponding to one sector. After the data of one sector was read out, a check is made in step 315 to see if the read buffer address 22c has exceeded the buffer end address 28c or not. When it does not exceed the buffer end address 28c, step 317 follows. When it exceeds the buffer end address 28c, the ring flag 27a is set to 1 in step 316 and the read buffer address 22c is set into the buffer head address 28b. In step 317, the number of read sectors 22b is decreased by one. A check is made in step 318 to see if the number of read sectors is equal to 0 or not. When it is not equal to 0, the processing routine is returned to step 304 and the above processes are repeated until it is set to 0. When the number of read sectors 22b is equal to 0, a check is made in step 319 to see if the read check flag 22d is equal to 1 or not. When it is equal to 0, step 302 follows. When it is equal to 1, the value of the read buffer address 22c is set into the store read address 27c in step 320. Then, step 302 follows and the next parameter is again read out of the read parameter 23. The above processes are repeated until all of the parameters stored in the read parameter 23 are read out. So long as there is data to be read out of the disc, when a space appears in the read parameter 23, the CPU stores the next parameter into the space area.

Figure 4:
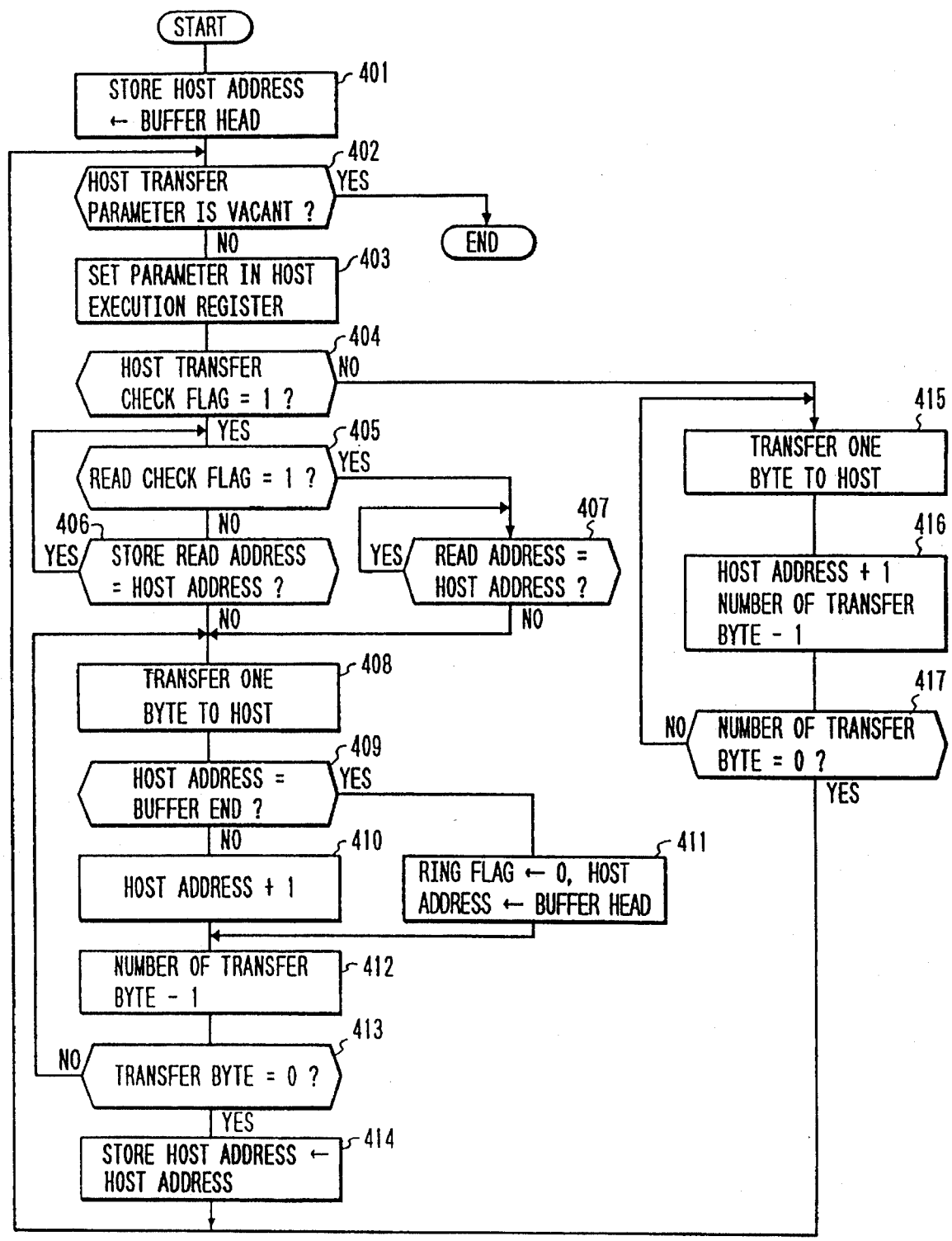
FIG. 4 is a flowchart showing the operation of a host transfer control unit of the ODC.

The operation of the host transfer control unit in the reading process will now be described with reference to FIG. 4. When the CPU 4 sets a plurality of parameters into the host transfer parameter 26 of the ODC 7 and instructs the host transfer control unit 24 to transfer the data from the buffer to the host, the host transfer control unit 24 operates in accordance with the following sequence. At this time, each value in the condition setting register 28 is set by the CPU 4.

The value of the buffer head address 28b is first set into the store host address 27c in step 401. A check is made in step 402 to see if the parameters have been set in the host transfer parameter 26 or not. When the host transfer parameter 26 is empty, the processing routine is finished. When there are the parameters, one set of parameters are read out of the head of the host transfer parameter 26 in step 403 and are set into the host transfer execution register 24. The host transfer check flag 25c is checked in step 404. When it is equal to 0, one byte of the data in the host buffer address 25a is transferred to the host in step 415. The host buffer address 25a is increased by one and the number of host transfer bytes 25b is decreased by one in step 416. The processes are repeated from step 415 until the number of host transfer bytes 25b is set to 0 in step 417. When it is set to 0, step 402 follows.

When the host transfer check flag 25c is equal to 1 in step 404, the processing routine advances to step 405 and subsequent steps.

The read check flag 22d is discriminated in step 405 to see if the read data exist in the buffer or not (buffer empty check). When the read check flag 22d is equal to 0, the store read address 27c is compared with the host buffer address 25a in step 406. When the addresses 27c and 25a are equal, this means that the buffer is empty, so that the processes are repeated from step 405 until the buffer is filled with data. When the read check flag 22d is equal to 1 in step 405, the processing routine advances to step 407 and the read buffer address 22c is compared with the host buffer address 25a. When they are equal, this means that the buffer is empty, so that the apparatus waits until the buffer is filled with data.

When the buffer is not empty, step 408 follows and one byte of the data in the host buffer address 25a is transferred to the host. The host buffer address 25a is compared with the buffer end address 28c in step 409. When they differ, the host buffer address 25a is increased by one in step 410. When they are equal, the ring flag 27a is cleared to 0 in step 411. The value of the buffer head address 28b is set into the host buffer address 25a. The number of host transfer bytes 25b is decreased by one in step 412. The number of host transfer bytes 25b is checked in step 413. When it is not equal to 0, the processes are repeated from step 408. When it is equal to 0, the value of the host buffer address 25a is set into the store host address 27b in step 414. The above processes are repeated until all of the parameters are read out of the host transfer parameter from step 402.

Figures 8A, 8B, 9:
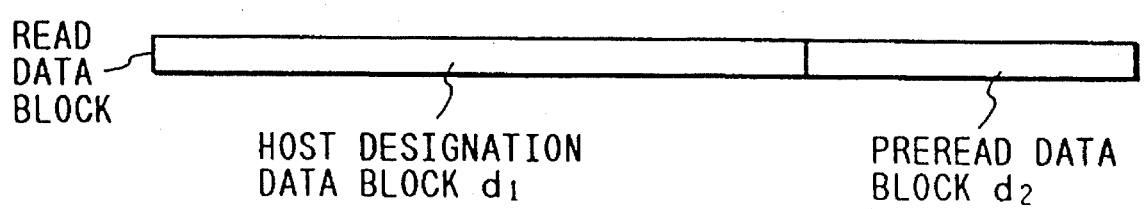
FIGS. 8A and 8B are diagrams showing parameters which are set into the ODC.
FIG. 9 is a diagram showing read data blocks of a disc.
Figure 10:
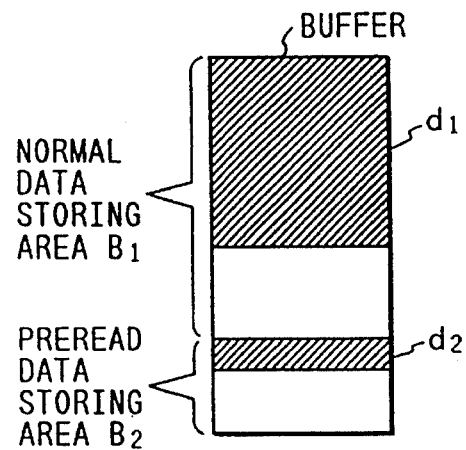
FIG. 10 is a diagram showing a data storing state of the buffer.
Figure 11A:
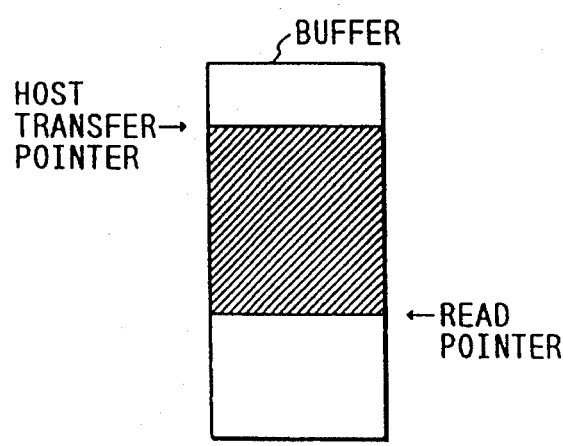
FIGS. 11A and 11B are diagrams showing data storing states of the buffer.
Figure 11B:
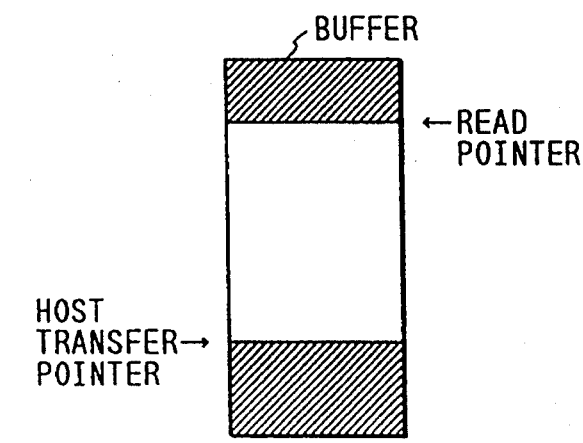

A practical example of the data reading process by the ODC 7 described above will now be explained with reference to FIGS. 5A, 5B, and 9. FIG. 9 shows a read data block of the disc which is stored into the buffer. The data block $d_2$ to be preread exists subsequent to the data block $d_1$ designated from the host. For the reading process of the read block data, the CPU 4 sets two parameters into the read parameter 23 of the ODC 7 and, after that, the CPU 4 allows the read control unit 21 to start the reading process. The first parameter is used to read the host designation data block $d_1$. The buffer address in the parameter is set to the head address in the normal data storing area $B_1$ in the buffer. The read check flag is set to 1. The second parameter is used to read the preread data block $d_2$. The buffer address in the parameter is set to the head address in the preread data storing area $B_2$ in the buffer. The read check flag is set to 0. The CPU 4 sets the value in the host designation data block $d_1$ into the host transfer parameter 26 of the ODC 7. That is, the buffer address is set to the head address in the normal data storing area $B_1$ in the buffer and the host check flag is set to 1. After the parameters were set, the CPU 4 instructs the host transfer control unit 24 to start the data transferring process to the host.

Figure 5A:
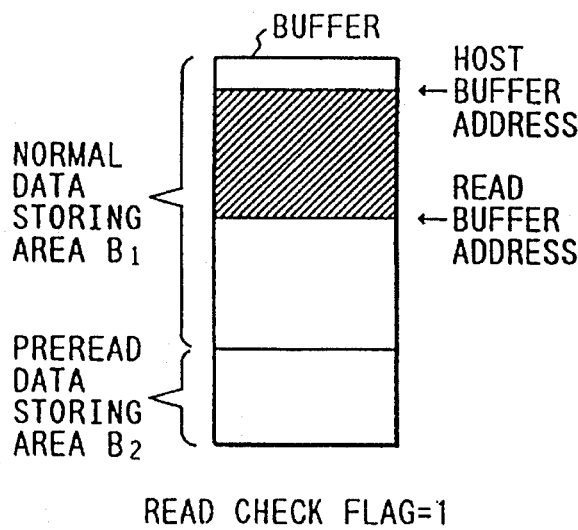
FIGS. 5A and 5B are diagrams showing data storing states of a buffer.
Figure 5B:
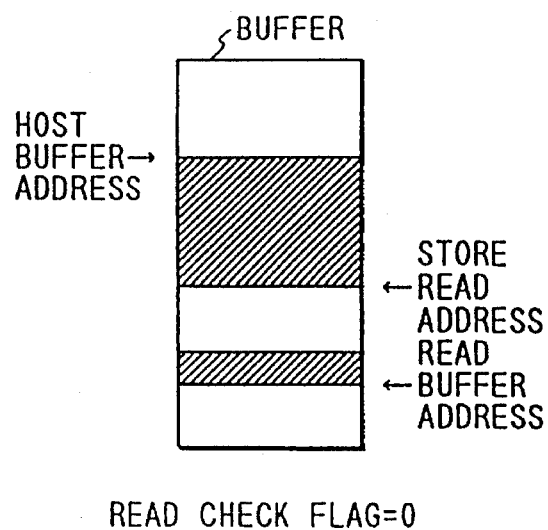

FIGS. 5A and 5B show states of the buffer in the case when the above parameters have been set and the reading process has been executed. In the diagrams, a hatched portion denotes data which have been read out of the disc and are not transferred yet to the host. Arrows show buffer addresses indicated by the host buffer address 25a, read buffer address 22c, and store read address 27c of the ODC 7.

FIG. 5A shows a state in the case when the host designation data block $d_1$ of the disc is being reproduced. The buffer empty check in the host transfer control unit 24 is executed by comparing the host buffer address 25a and the read buffer address 22c. FIG. 5B shows a state in the case when the preread data block $d_2$ is being reproduced. The buffer empty check in the host transfer control unit 24 is executed by comparing the host buffer address 25a and the store read address 27c.

In the above embodiment, in the data block to be read, the data which are not transferred to the host are the prepared data block. However, such data are not limited to the preread data but also may be a data block such as an alternate sector, disc management information, or like data which are not directly data transferred to the host apparatus but are stored into the buffer. On the other hand, in the above embodiment, the data which are not transferred to the host are located after the read data block. However, that data also can be located at any position in the read data block. For instance, that data can be located at the head or halfway of the data block or like locations. Further, in the above embodiment, although the data which are not transferred to the host are the data of one block, the data of a plurality of blocks also can be used.

In the above embodiment, the comparison between the reproduction data amount and the host transfer data amount for the buffer empty check has been performed by the storage pointer (read buffer address 22c or store read address 27c) into the buffer and the host transfer pointer (host buffer address 25a). The buffer empty check, however, also can be executed by another method whereby the number of reproduction data bytes of the block of the read check flag=1 is compared with the number of host transfer bytes of the block of the host check flag=1 by providing a counter which indicates the number of host transfer bytes.

A data reading process of the data block including an alternate sector will now be described.

Figure 12:
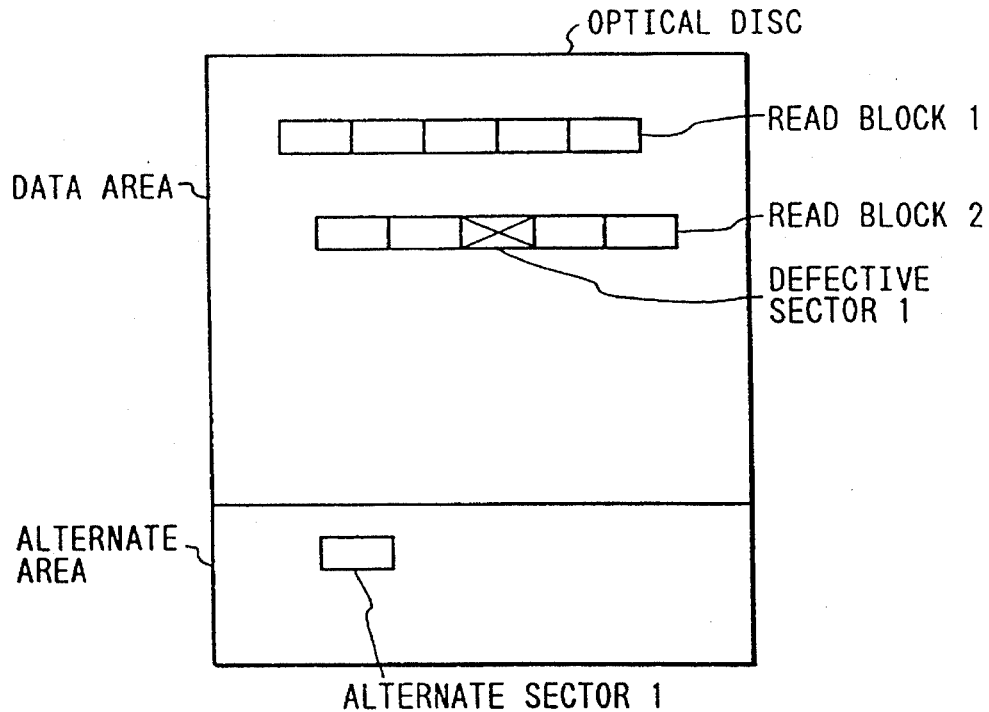
FIG. 12 is a diagram showing a format of the disc.
Figure 13A:
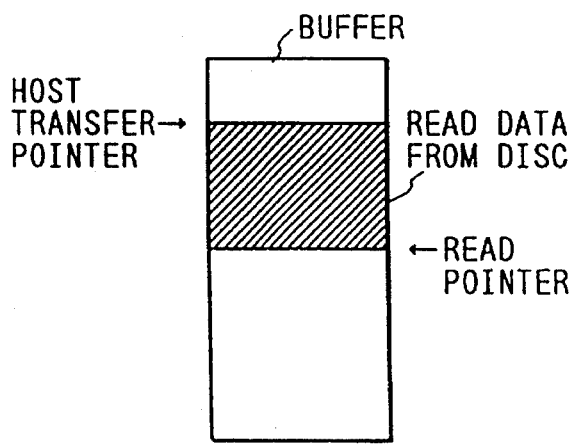
FIGS. 13A and 13B are diagrams of data storing states of the buffer for explaining a conventional example.
Figure 13B:
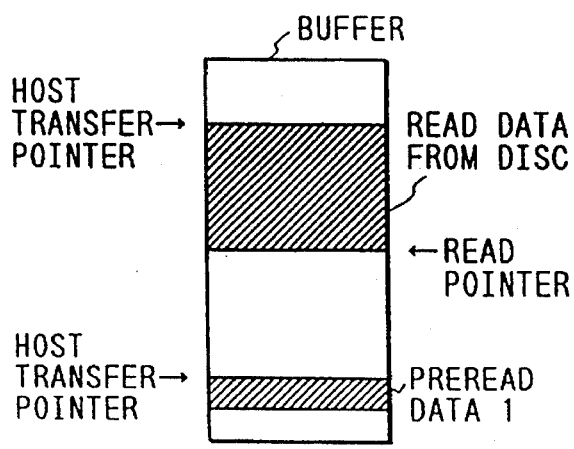

It is now assumed that the data block which is read comprises five sectors like the read block 2 in FIG. 12 and that one of the sectors is a defective sector and is alternated to the alternate sector of the alternate area.

Figure 6:
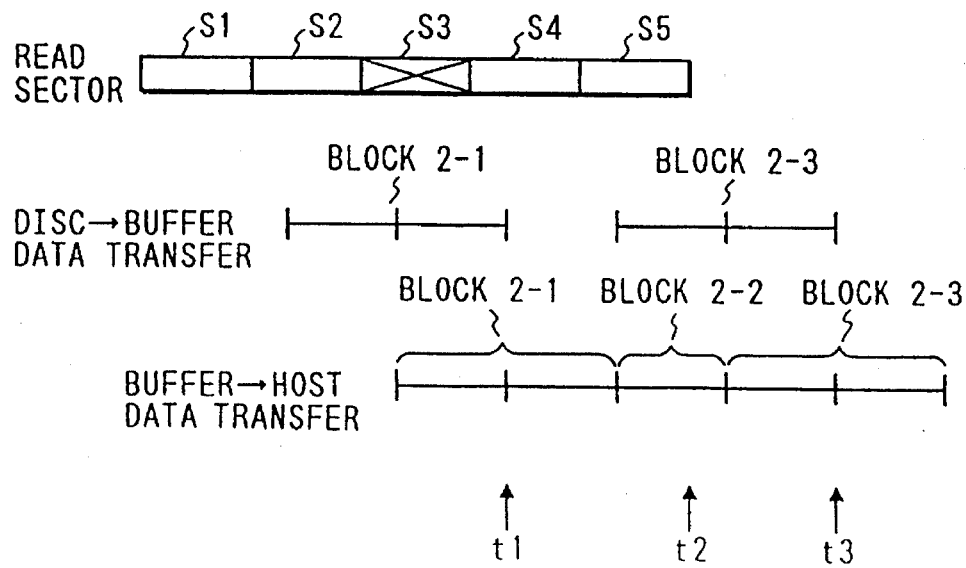
FIG. 6 is a timing chart showing the data transfer.

FIG. 6 is a timing chart showing the data transfer of the read block 2. FIGS. 7A to 7D are state diagrams of the data which have been read into the buffer. FIGS. 8A and 8B show contents of the parameters which are set into the ODC 7.

Figure 7A:
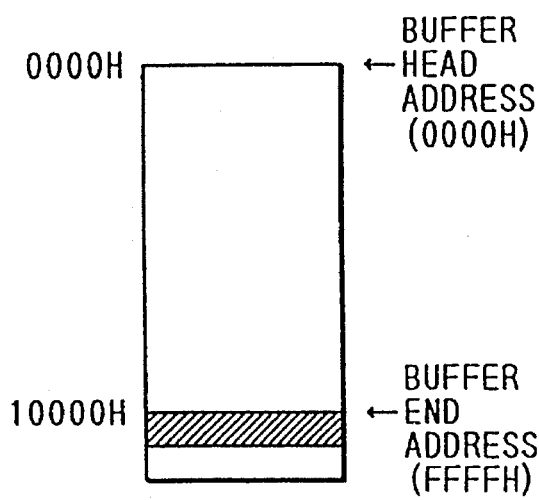
FIGS. 7A to 7D are diagrams showing data storing states of the buffer.

As shown in FIG. 6, the read block 2 comprises sectors $S_1$ to $S_5$ as shown in FIG. 6 and the sector $S_3$ is a defective sector and is alternately recorded in the alternate area. For convenience of explanation, it is assumed that the data is divided into blocks every continuous reading process, the sectors $S_1$ and $S_2$ are set to a block 2-1, the alternate sector data corresponding to the defective sector 3 are set to a block 2-2, and the sectors $S_4$ and $S_5$ are set to a block 2-3. It is assumed that the data of each sector consists of 512 bytes. The CPU 4 first discriminates whether a defective sector exists in the read block to be reproduced or not. When a defective sector exists, the alternate sector corresponding to the defective sector $S_3$ is previously reproduced and stored from address 10000H in the buffer RAM 8. The presence or absence of the defective sector, the defective sector, and the position of the alternate sector can be known from the management information. FIG. 7A shows the state of the buffer in the above case. In that diagram, a hatched portion shows data which have been read out of the disc. The addresses in a range from the head address 0 to the address FFFFH in the buffer are used for reading of the disc data area and such an area is used as a ring buffer. On the other hand, the addresses from the address 10000H and subsequent addresses are used as a preread area of the alternate sector. After the data of the alternate sector were read, the CPU 4 sets the parameters shown in FIGS. 8A and 8B into the ODC 7. FIG. 8A shows values which are set into the read parameter 23 of the ODC 7. The parameter 1 corresponds to the block 2-1, the sector ID indicates the ID number of the head sector $S_1$, the number of sectors assumes 2, the buffer address assumes 0, and the check flag assumes 1. The parameter 2 corresponds to the block 2-3. The sector ID indicates the ID number of the head sector $S_4$, the number of sectors assumes 2, the buffer address assumes 1024, and the check flag assumes 1.

FIG. 8B shows values which are set into the host transfer parameter 26 of the ODC 7. The parameter 1 corresponds to the block 2-1, the buffer address assumes 0, the number of transfer bytes assumes 1024, and the buffer flag assumes 1. The parameter 2 corresponds to the block 2-2 of the preread alternate sector. The buffer address assumes 10000H, the number of transfer bytes assumes 512, the buffer flag assumes 0, and the buffer full check is not performed. The parameter 3 corresponds to the block 2-3. The buffer address assumes 1024, the number of transfer bytes assumes 1024, and the buffer flag assumes 1.

After the parameters were set into the ODC 7, the CPU 4 instructs the R/W unit 11 to move the reading head to the sector $S_1$. The CPU 4 instructs the read control unit 21 of the ODC 7 to start the reading process and also instructs the host transfer control unit 24 to start the data transferring process from the buffer to the host.

When the reading head moves to the sector $S_1$ and reads out the data, the ODC 7 transfers the data which have been error corrected by the ECC circuit 9 to the buffer RAM 8. When the read data of as much as one sector are stored into the buffer RAM 8, the data transfer to the host is started.

FIG. 6 shows a state of the data transfer. Upon transfer of the data which have been read out of the disc into the buffer, the data transfer of the block 2-1 is started from the time point of the completion of the error correction of the sector $S_1$. The data transfer of the block 2-3 is started from the time point of the completion of the error correction of the sector $S_4$. In the data transfer from the buffer to the host, the data transfer is started at the time point when the data whose error correction of the sector $S_1$ had been finished have been stored in the buffer. Subsequently, the similar processes are executed to the blocks 2-2 and 2-3.

Figure 7B:
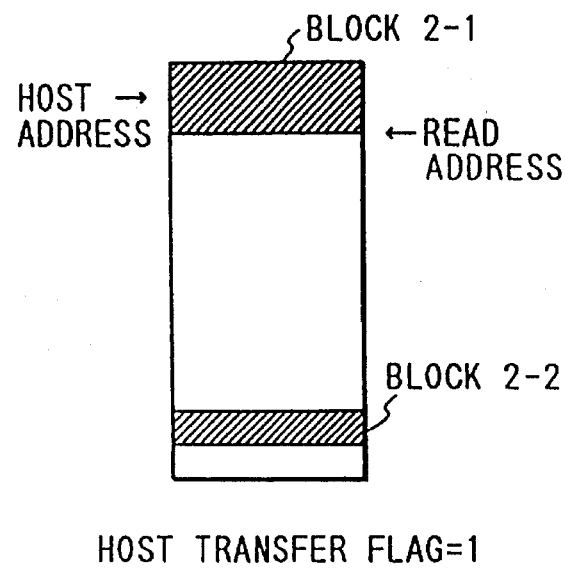
Figure 7C:
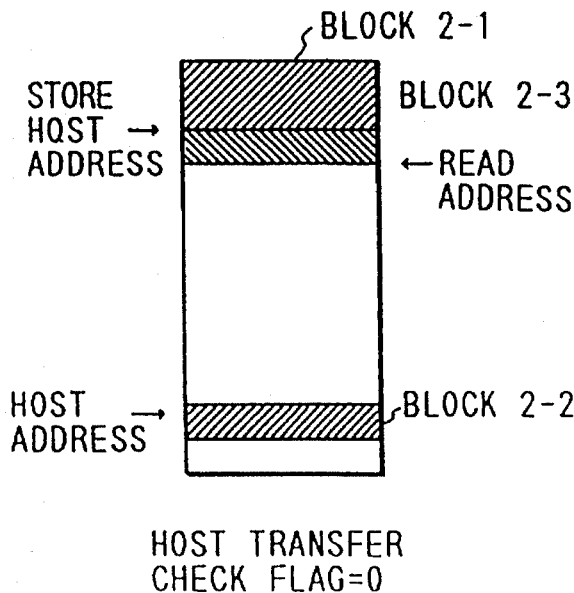
Figure 7D:
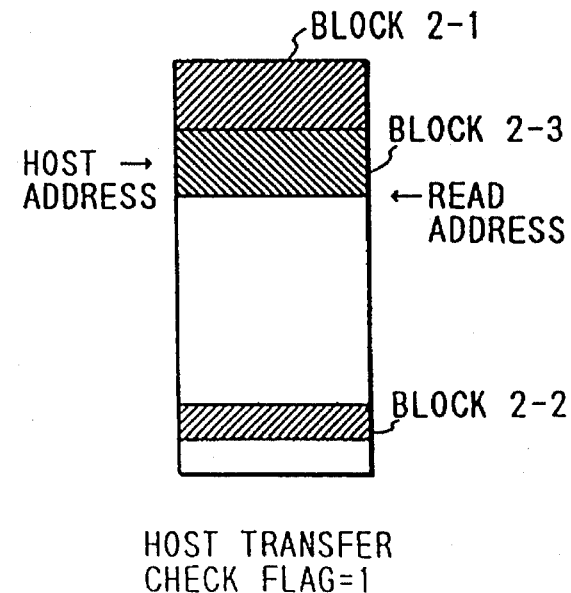

In FIG. 6, $t_1$ indicates a certain time point when the data of the block 2-1 in the buffer is being transferred to the host, $t_2$ denotes a certain time point when the data of the block 2-2 is being transferred to the host, and $t_3$ shows a certain time point when the data of the block 2-3 is being transferred to the host. FIGS. 7B, 7C and 7D show buffer states at the time points $t_1$, $t_2$, and $t_3$ in FIG. 6, respectively. In FIG. 6, a hatched portion denotes the data which have been read out of the disc. The addresses designated by the host buffer address 25a, read buffer address 22c, and store host address 27b are shown by arrows, respectively. In the states of FIGS. 7B and 7D, since the host transfer check flag 22d is equal to 1, the buffer full check in the read control unit 21 is executed by comparing the host buffer address 25a and the read buffer address 22c.

In the state of FIG. 7C, since the host transfer check flag 22d is equal to 0, the buffer full check in the read control unit 21 is performed by comparing the store host address 27b and the read buffer address 22c.

In the embodiment, the data which have been preread into the buffer are the data read out of the alternate sector. However, such data are not limited to the data of the alternate sector but it is also possible to use the data of an ordinary sector which have been accessed or the preread data described in the first embodiment.

In the foregoing embodiment, the comparison between the reproduction data amount and the host transfer data amount for the buffer full check has been executed by using the storing pointer (read buffer address 22c) to the buffer and the host transfer pointer (host buffer address 25a or store host address 27b). The buffer full check, however, also can be performed by another method whereby the number of reproduction data bytes of the block of the read check flag=1 is compared with the number of host transfer bytes of the block of the host check flag=1 by providing a counter which indicates the number of host transfer bytes.

The present invention is not limited to the foregoing embodiments but many modifications and variations are possible within the spirit and scope of the appended claims of the invention.

What is claimed is:

1. An information reproducing apparatus for reproducing data recorded on a recording medium, said apparatus comprising:

input means for inputting data read out from data blocks of the recording medium;

a buffer for storing data input by said input means, said buffer having a first storage area and a second storage area, said first storage area storing data of normal data blocks input by said input means and being a ring buffer in which data storing is restarted from a head address when the data storing at an end address is completed, and said second storage area storing data of specific data blocks input by said input means;

transfer means for transferring the data stored in said buffer to a host apparatus;

control means for controlling said apparatus to execute in parallel a first process for storing data into one of the first storage area and the second storage area in said buffer and a second process for reading out data stored in one of the first storage area and the second storage area in said buffer to transfer data to the host apparatus by said transfer means; and determining means for determining whether there are data in the first storage area to be transferred to the host apparatus by comparing a storing address in said buffer of the data which are being stored into the first storage area with a read address in said buffer of the data which are being read out from the first storage area, when said control means reads out the data already stored in the first storage area while storing the data of the normal data blocks into the first storage area, wherein said determining means does not compare the storing address in said buffer of the data which are being stored into said second storage area with the read address in said buffer of the data which are being read out from the first storage area, when said control means reads out the data already stored in the first storage area while storing the data of the specific data blocks into the second storage area.

2. An apparatus according to claim 1, wherein when the data of the specific data block are stored into the second storage area in the buffer, said determining means determines whether there are data in the first storage area to be transferred to the host apparatus by comparing the last storing address in said buffer of the data which have been stored into the first storage area in said buffer just prior to storing the data of the specific data block with the read address in said buffer of the data which are being read out from the first storage area.

3. An apparatus according to claim 1, wherein when said determining means determines that no data in the buffer are to be transferred to the host apparatus, said control means temporarily interrupts the transferring of data to the host apparatus.

4. An information reproducing apparatus for transferring data which have been read out from a recording medium to a host apparatus, said apparatus comprising:

input means for inputting data read out from data blocks of the recording medium;

a buffer for storing data input by said input means, said buffer having a first storage area and a second storage area, said first storage area storing data of normal data blocks input by said input means and being a ring buffer in which data storing is restarted from a head address when the data storing at an end address is completed, and said second storage area storing data of specific data blocks input by said input means;

transfer means for transferring the data stored in said buffer to a host apparatus:

preread control means for controlling said apparatus to read out data of a next data block of a data block whose transfer to the host apparatus has been designated, subsequent to the reading of data of the designated data block;

storage control means for controlling said apparatus to store data of the designated data block into said first storage area in said buffer and data of the next data block of the designated data block into said second storage area in said buffer;

control means for controlling said apparatus to execute in parallel a first process for storing the data into one of the first storage area and the second storage area in said buffer and a second process for reading out the data from one of the first storage area and the second storage area in said buffer to transfer data to the host apparatus by said transfer means; and determining means for determining whether there are data in the first storage area to be transferred to the host apparatus by comparing a storing address in said buffer of the data which are being stored into the first storage area with a read address of the data which are being read out from the first storage area, when said control means reads out the data already stored in the first storage area while storing the data of the normal data blocks into the first storage area, wherein said determining means does not compare the storing address in said buffer of the data which are being stored in the second storage area with the read address in said buffer of the data which are being read out from the first storage area, when said control means reads out the data already stored in the first storage area while storing the data of the specific data blocks into the second storage area.

5. An apparatus according to claim 4, wherein during the storage of the data into the second storage area in the buffer, said determining means determines whether there are data in the first storage area to be transferred to the host apparatus by comparing the storing address in said buffer of the data which were last stored into the first storage area with the read address in said buffer of the data which are being read out from the first storage area.

6. An apparatus according to claim 4, wherein after data of the designated data block has been transferred to the host apparatus, and when there is an instruction for transferring data of the next data block of the designated data block, data of the next data block is read out from the second storage area and transferred to the host apparatus without reading out data of the next data block from the recording medium.

7. An apparatus according to claim 4, wherein when said determining means determines that there are no data in the first storage area to be transferred to the host apparatus, the control means temporarily interrupts the transferring process.

8. An information reproducing apparatus for reproducing data recorded on a recording medium, said apparatus comprising:

input means for inputting data read out from data blocks of the recording medium;

a buffer for storing data input by said input means, said buffer having a first storage area and a second storage area, said first storage area storing data of normal data blocks input by said input means and being a ring buffer in which data storing is restarted from a head address when the data storing at an end address is completed, and said second storage area storing data of specific data blocks input by said input means;

transfer means for transferring the data stored in said buffer to a host apparatus;

control means for controlling said apparatus to execute in parallel a first process for storing data into one of the first storage area and the second storage area in said buffer and a second process for reading out data stored in one of the first storage area and the second storage area in said buffer to transfer data to the host apparatus by said transfer means; and determining means for determining whether an amount of data in the buffer which have not yet been transferred to the host apparatus, is equal to a predetermined amount by comparing a storing address in said buffer of the data which are being stored in the first storage area with a read address in said buffer of the data which are being read out from first storage area, when said control means reads out the data already stored in the first storage area while storing the data of the normal data blocks into the first storage area, wherein said determining means does not compare the storing address in said buffer of the data which are being stored into the first storage area with the read address in said buffer of the data which are being read out from the second storage area, when said control means reads out the data already stored in the second storage area while storing the data of the normal data blocks into the first storage area.

9. An apparatus according to claim 8, wherein when the data stored in the second storage area in the buffer are transferred to the host apparatus, said determining means determines whether an amount of data in the buffer which have not yet been transferred to the host apparatus is equal to a predetermined amount by comparing the read address in said buffer of the data which have been read out from the first storage area just prior to reading out the data from the second storage area with the storage address in said buffer of the data which are being stored into the first storage area.

10. An apparatus according to claim 8, wherein when said determining means determines that the amount of data in the first storage area in said buffer which have not yet been transferred to the host apparatus is equal to the predetermined amount, said control means temporarily interrupts the storage of the data into the first storage area in the buffer.

11. An information reproducing apparatus for transferring data which have been read out from a recording medium to a host apparatus, said apparatus comprising:

input means for inputting data read out from data blocks of the recording medium;

a buffer for storing data input by said input means, said buffer having a first storage area and a second storage area, said first storage area storing data of normal data blocks input by said input means and being a ring buffer in which data storing is restarted from a head address when the data storing at an end address is completed, and said second storage area storing data of specific data blocks input by said input means;

transfer means for transferring the data stored in said buffer the host apparatus;

preread control means for controlling said apparatus to read out data of a next data block whose transfer to the host apparatus has been designated, subsequent to the reading of data of the designated data block;

storage control means for controlling said apparatus to store data of the designated data block into the first storage area in said buffer and data of the next data block of the designated data block into the second storage area in said buffer;

control means for controlling said apparatus to execute in parallel a first process for storing the data into one of the first storage area and the second storage area in said buffer and a second process for reading out the data from one of the first storage area and the second storage area in said buffer to transfer the data to the host apparatus by said transfer means; and determining means for determining whether an amount of data in the first storage area in said buffer which have not yet been transferred to the host apparatus is equal to a predetermined amount by comparing a storing address in said buffer of the data which are being stored into the first storage area with a read address in said buffer of the data which are being read out from first storage area, when said control means reads out the data already stored in the first storage area while storing the data of the normal data blocks into the first storage area, wherein said determining means does not compare the storing address in said buffer of the data which are being stored into the first storage area with the read address in said buffer of the data which are being read out from the second storage area, when said control means reads out the data already stored in the second storage area while storing the data of the normal data blocks into the first storage area.

12. An apparatus according to claim 11, wherein when the data are being read out of the second storage area in the buffer, said determining means determines whether the amount of data in the first storage area which have not yet been transferred to the host apparatus is equal to the predetermined amount by comparing the read address in said buffer of the data which were last read out from the first storage area with the storing address in said buffer of the data which are being stored.

13. An apparatus according to claim 11, wherein when said determining means determines that the amount of data in the first storage area in said buffer which have not yet been transferred to the host apparatus is equal to the predetermined amount, said control means temporarily interrupts the storage of the data into the first storage area in said buffer.

\* \* \* \* \*

UNITED STATES PATENT AND TRADEMARK OFFICE
CERTIFICATE OF CORRECTION

PATENT NO. : 5,537,552
DATED : July 16, 1996
INVENTOR(S) : Yutaka OGASAWARA, et al.

It is certified that error appears in the above-indentified patent and that said Letters Patent is hereby corrected as shown below:

ON THE COVER PAGE:

In item [22], Filing Date, "Filed: August 17, 1993" should read --Filed: Jul. 19, 1993--.

IN THE DISCLOSURE:

COLUMN 2:

Line 1, "are" should read --is--.

COLUMN 4:

Line 49, "hand shaking" should read --transfer--.

UNITED STATES PATENT AND TRADEMARK OFFICE
CERTIFICATE OF CORRECTION

PATENT NO. : 5,537,552
DATED : July 16, 1996
INVENTOR(S) : Yutaka OGASAWARA, et al.

It is certified that error appears in the above-indentified patent and that said Letters Patent is hereby corrected as shown below:

COLUMN 5:

Line 65, "is" should read --are-- and "are" should read --is--.

COLUMN 7:

Line 24, "is" should read --are--.

COLUMN 9:

Line 29, "blocks every" should read --blocks in a--; and
Line 39, "the defective sector," (second occurrence) should read --the position of the defective sector,--.

UNITED STATES PATENT AND TRADEMARK OFFICE
CERTIFICATE OF CORRECTION

PATENT NO. : 5,537,552
DATED : July 16, 1996
INVENTOR(S) : Yutaka OGASAWARA, et al.

It is certified that error appears in the above-indentified patent and that said Letters Patent is hereby corrected as shown below:

COLUMN 14:

Line 5, "buffer the" should read --buffer to the--.

Signed and Sealed this

Eleventh Day of February, 1997

Attest:

BRUCE LEHMAN

Attesting Officer

Commissioner of Patents and Trademarks